United States Patent [19]

Yokotani et al.

[11] Patent Number: 5,128,827
[45] Date of Patent: Jul. 7, 1992

[54] ELECTRONIC DEVICES, METHOD FOR FORMING END TERMINATIONS THEREOF AND PASTE MATERIAL FOR FORMING SAME

[75] Inventors: Yoichiro Yokotani, Suita; Seiichi Nakatani, Hirakata; Koichi Kugimiya, Toyonaka, all of Japan

[73] Assignee: Matsushita Electric Industrial Co., Ltd., Osaka, Japan

[21] Appl. No.: 671,930

[22] Filed: Mar. 20, 1991

Related U.S. Application Data

[63] Continuation-in-part of Ser. No. 538,559, Jun. 15, 1990.

[30] Foreign Application Priority Data

Jun. 16, 1989 [JP] Japan .................................. 1-155359

[51] Int. Cl.$^5$ .......................... H01G 1/00; H01G 7/00; B22F 7/00
[52] U.S. Cl. .................... 361/309; 29/25.42; 419/19
[58] Field of Search .............. 361/320, 321, 308, 309, 361/310; 29/25.42; 252/512; 419/19; 264/61

[56] References Cited

U.S. PATENT DOCUMENTS

| | | | |
|---|---|---|---|
| 4,130,854 | 12/1978 | Hertz | 361/304 |
| 4,353,153 | 10/1982 | Prakash | 29/25.42 |
| 4,451,869 | 5/1984 | Sakabe et al. | 361/309 |
| 4,517,155 | 5/1985 | Prakash et al. | 419/19 |
| 4,740,863 | 4/1988 | Langlois | 361/309 |
| 4,881,308 | 11/1989 | McLaughlin et al. | 29/25.42 |

Primary Examiner—Donald Griffin
Attorney, Agent, or Firm—Wenderoth, Lind & Ponack

[57] ABSTRACT

An improved electronic device having metal-glazing type end terminations comprising a surface metal phase of Sn or Zn, is produced by sintering a paste material containing a matrix metal powder (Cu and/or Ni), a fluxing metal powder and an organic binding material, so that the surface portion serves to improve wettability and solderability of the end termination owing to its composition being similar to solder.

18 Claims, 8 Drawing Sheets

After sintering process

— Pb rich phase
— Cu metal phase
— Cu-Pb eutectic phase

ELECTRONIC DEVICES, METHOD FOR FORMING END TERMINATIONS THEREOF AND PASTE MATERIAL FOR FORMING SAME

This application is a continuation-in-part of copending application, Ser. No. 07/538,559 filed Jun. 15, 1990.

BACKGROUND OF THE INVENTION

This invention generally relates to electronic devices or components comprising a ceramic body and end terminations having a good absorbant effect against heat shock on soldering as well as a good solderability on connecting a conducting wire, and particularly relates to ones having an end termination comprising a metal phase as an electrical conducting component and an inorganic glass phase as a bonding component for adhesion to the ceramic body.

This invention also relates to a method for forming an end termination at very low cost as well as a paste composition for forming same.

Recently, with developments in on the miniaturization and high densification of circuits, most of electronic devices and components have been generally mounted on the surfaces of base plates. Among these devices and components, electronic components such as solid resistant elements and multi-layer ceramic capacitors are provided with end terminations, which are mounted on the ends of ceramic bodies by bonding a sintered metallic powder product thereto with glass frit. This arrangement is called a metal glazing type one.

As this end termination portion is soldered directly on a patching metal surface of circuit base plate, it is required to have a good wettability with solder and prevent from occurring an absorbing phenomenon by solder wherein a metal phase of the end termination portion can be absorbed and swept away by means of contacting a melting solder.

As the end termination, there has been conventionally used a silver electrode which can be sintered in air. For solving the above problems, there are now proposed to use an Ag-Pd alloy electrode in place of the silver electrode and also to cover a sintered silver end termination at outer surface by a Ni coating and further cover it by a Sn-Pb coating (solder plating). However, it is disadvantageous that use of this method make a productivity of the end termination worse and thus makes production cost thereof high.

Furthermore, when a solder melt contacts an end termination of an electronic component on soldering it on a patch board, cracks have been sometimes occurred at the end termination owing to a large tension thereon caused by a temperature difference between the ceramic body of the component and the end termination adhered thereto and thus by a heat expansion difference therebetween. According to demand, therefore, it has been required to preheat the component in order to avoid generation of such a big temperature difference on soldering.

Meanwhile, for decreasing the cost of production, it is requested to use a base metal such as Cu, Ni and so on as end termination materials in place of silver. In multi-layered capacitors, provided with internal electrodes made of the base metal, which is subjected to a sintering treatment under an atmosphere containing a low partial oxygen pressure, it has been already proposed as described in U.S. Pat. No. 3,920,781 to use an end termination made of a base metal such as Ni and Cu. These base metals have a poor absorption phenomenon as above, but have a problem in solderability, especially in a lowering of wettability owing to surface oxidation of the end termination. Therefore, it has been proposed to subject outer surface of the end termination to a solder plating. Also, according to demand, it has been attempted to subject the component to a preheat treatment in order to avoid generation of cracks as in the conventional case.

The above plating method is not advantageous since the requirement of additional steps for plating makes manufacturing process complicated and also the electronic components expensive. Furthermore, in some case, a dipping treatment of the component in a plating liquid may change and deteriorate its chemical and physical properties. The plating method also has no effect for avoiding generation of crack in the component under soldering.

SUMMARY OF THE INVENTION

Accordingly, it is a primary object of the present invention to provide an improved electronic device or component having metal-glazing type end terminations which can be manufactured at low cost and provided with a good solderability and also less deterioration property owing to oxidation as well as superior shock absorption effect on soldering.

Another object of the present invention is to provide a paste material for forming the end termination having the above superior properties by means of sintering treatment.

A further object of the present invention is to provide a method for forming the end termination having the above superior properties by means of sintering treatment.

In accordance with one aspect of this invention, there is provided an electronic device having a ceramic body and at least one pair of end terminations thereof comprising a surface metal phase for electrical conducting and a bottom inorganic glass phase adhered to a ceramic body, wherein the metal phase is made of Cu and/or Ni alloy containing at least one of alloying metal components selected from the group consisting of Pb, Sn and Zn.

In these inventive devices and components, a wettability on soldering can be improved because Cu and/or Ni alloy with Pb, Sn and/or Zn can be easily wetted by solder melt made of Pb-Sn alloy and a lowering of solderability can be suppressed owing to an improved inhibitory action against oxidation reaction at the end termination.

As will be seen from the following disclosure, the expression "alloy" means that any metal phases can be composed of a matrix metal and metals such as Cu and/or Ni and a fluxing metal and metals such as Pb, Sn and/or Zn and includes a metal mixture phase, an intermetallic compound phase and a solid solution phase.

In the Cu alloys, the metal phase is preferably composed of Cu alloy with 0.3 to 70 wt % of Pb, 0.8 to 65 wt % of Sn or 0.5 to 80 wt % of Zn based on the weight of the Cu alloy, while in the Ni alloys, the metal phase is preferably composed of Ni alloy with 1.5 to 45 wt % of Pb, 1.5 to 55 wt % of Sn or 1.5 to 65 wt % of Zn based on the weight of the Ni alloy because a good improvement on the above effect can be not obtained out of the above alloying metal content range.

It is allowable to add two or more of the alloying metal in combination and to add a third component or components such as Bi and any other components which is conventionally used for solder so long as the above inventive desired effects are not decreased.

This invention is especially suitable for a multi-layer capacitor made up of ceramic dielectric layers and internal electrode layers, for instance made of a base metal, extending between the ceramic dielectric layers.

In the preferred embodiments of the invention, there is provided an end termination for electronic devices or components made by directly sintering an electrode metal material on a ceramic dielectric body, which comprises:

(A) a bottom portion at least partially made of an inorganic glass phase adhered to the ceramic body;

(B) a main intermediate portion made of at least one selected from the group consisting of ($B_1$) metal mixture phases, which can be made up of at least two phases selected from (1) a matrix metal phase mainly composed of Cu or Ni, (2) a fluxing metal phase mainly composed of Pb, Sn and/or Zn and (3) an intermetallic compound phase composed of one of the matrix metals and one or more of the fluxing metals, and ($B_2$) solid solution phases composed of one of the matrix metals and one or more of the fluxing metals;

(C) a surface layer portion at least partially made of a phase which contains higher average content of the fluxing metal than that of the main portion.

The bottom portion must at least partially, preferably mainly contains an inorganic glass phase, since the end termination can be adhered to the ceramic body mainly by the glass phase. However, the adhesion surface need not be all covered by a layer made of the inorganic glass phase to maintain electrical conductivity through the end termination.

Figure 8:
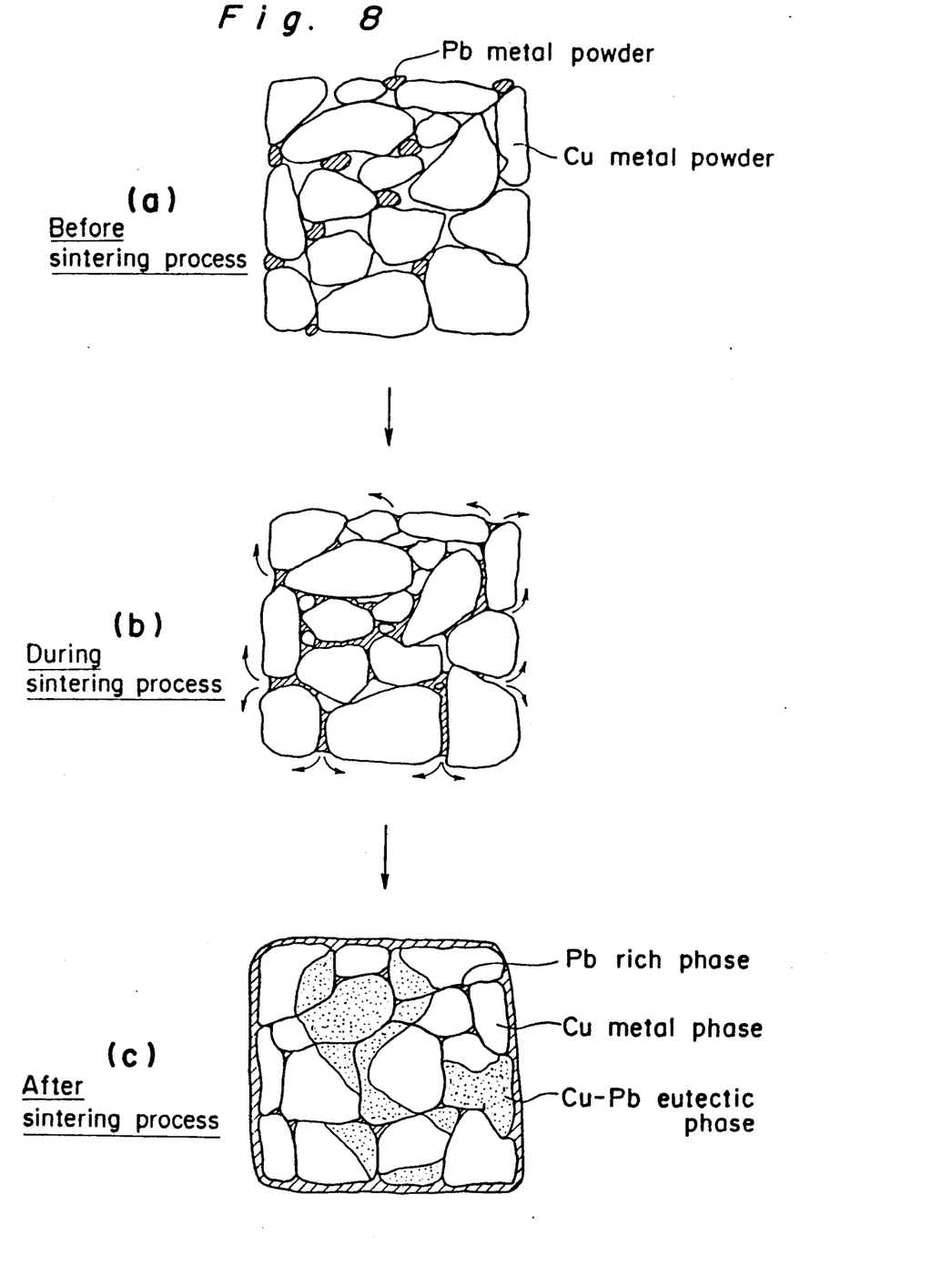

The main portion of the end termination may comprise a matrix metal such as Cu and Ni and various matrix metal rich alloys including a metal mixture, an intermetallic compound and solid solution as well as alloys having different content ratio between a matrix metal and an alloying metal. The main portion may contain a fluxing metal such as Pb, Sn and Zn which remains between sintered matrix particle-particle boundaries as shown in FIG. 8(b). The main portion thus formed serves to alleviate heat shock occurring on soldering due to lowering the heat conductivity of the end termination.

The surface portion may be formed by the fluxing metal which is melted out from the main portion to the surface during a sintering process and is solidified thereon as shown in FIG. 8(a)-(c). The surface portion may be completely or partially covered by the fluxing metal or fluxing metal rich alloys. The surface portion thus formed serves to improve a wettability and a solderability of the end termination owing to similar composition as that of solder.

In accordance with a further aspect of this invention, there is provided a paste material for forming an end termination of an electronic device and component by a direct sintering treatment on a ceramic body, which comprises (a) a matrix metal powder which can not be melted itself during the sintering treatment of the paste material, (b) incongruently melt to form a liquid phase by itself or by an electrically caused reaction thereof with the matrix metal during the sintering treatment, (c) an inorganic bonding material powder which can be melted and adhered to the ceramic body under the sintering treatment, (d) an organic binding material which makes the other powder mixture into a paste and tends to volatilize out during the sintering treatment of the paste material.

The matrix metal powder is preferably selected from Cu metal powder, Ni metal powder and alloy powder thereof.

The fluxing metal powder is preferably selected from Pb metal powder, Sn metal powder, Zn metal powder and alloys thereof such as Pb-Sn alloy powder, Pb-Zn alloy powder, Sn-Zn alloy powder, Pb-Sn-Zn alloy powder, Pb-Bi alloy powder, Sn-Bi alloy powder, Zn-Bi alloy powder, Pb-Sn-Bi alloy powder, Pb-Zn-Bi alloy powder, Sn-Zn-Bi alloy powder, Pb-Sn-Zn-Bi alloy powder.

The inorganic bonding material powder may be selected from a conventional glass frit and any other same material powders which can be melt and adhered to a ceramic body, for example a mixture of ZnO powder(30 mol %), $B_2O_3$ powder(30 mol %) and $SiO_2$ powder(40 mol %) and a powder, made by melting a mixture at 1200° C. and subjecting the melt to a water fraction by dropping it into a water and then to a grinding treatment by a ball-mill, are suitable for use.

The organic binding materials may comprise an organic binding resin such as ethyl cellulose and acryl resins and an organic solvent such as Carbitol acetate, α-terpineol, toluene and any other solvent or disperant by which the binding resin materials can be dissolved and be swelled to control a viscosity and a drying speed etc.

The paste composition may be prepared by a metal component containing a matrix metal and a fluxing metal (70-80 wt %), a glass frit(1-6 wt %) and an organic binding material(15-30%).

The matrix metal powder and the fluxing metal powder may be added as a solid solution metal powder between Cu and/or Ni matrix metal and Pb, Sn and/or Zn metal and also may be added as an alloy powder between Cu and/or Ni matrix metal and Pb, Sn and/or Zn metal. For example, preferred compositions may comprise (1) a Cu powder, a Pb powder, an inorganic frit powder, an organic binder and an organic solvent, wherein the Cu to Pb weight ratio is 99.7-30 to 0.3-70; (2) a Cu powder, a Sn powder, an inorganic frit powder, an organic binder and an organic solvent, wherein Cu to Sn weight ratio is 99.2-35 to 0.8-65; (3) a Cu powder, a Zn powder, an inorganic frit powder, an organic binder and an organic solvent, wherein Cu to Zn weight ratio is 99.5-20 to 0.5-80; (4) a Ni powder, a Pb powder, an inorganic frit powder, an organic binder and an organic solvent, wherein Ni to Pb weight ratio is 98.5-55 to 1.5-45; (5) a Ni powder, a Sn powder, an inorganic frit powder, an organic binder and an organic solvent, wherein Ni to Sn weight ratio is 98.5-45 to 1.5-55; (6) a Ni powder, a Zn powder, an inorganic frit powder, an organic binder and an organic solvent, wherein Ni to Zn weight ratio is 98.5-1.5-65.

In accordance with further more aspect of this invention, there is provided a method for making end terminations of electronic devices or components by direct sintering the above paste material on a ceramic body thereof.

In the method, it is important to control a sintering temperature in order that the fluxing metal can be congruently melted or incongruently melt to be a liquid phase by itself or by an eutectic reaction with the matrix metal, while the matrix metal can not be melted by itself. Thereby, the fluxing metal can be seeped to the surface of a metal mixture as the sintering process proceeds, and then the melt is to be solidified thereon in layers, so that the resulting end termination comes to have a good wettability and solderability and can be made much more easily in comparison with a conventional plating method. This process is shown in FIG. 8(a) to FIG. 8(c).

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing the spirit of the invention.

BRIEF DESCRIPTION OF THE DRAWINGS

FIG. 8 (a) to 8 (c) are process diagrams of an end termination according to this invention.

DESCRIPTION OF THE PREFERRED EMBODIMENTS

EXAMPLE 1

Fixed resistor element

A fixed resistor is provided from a grazing resistance body made of rhenium oxide-zinc borosilicate glass sintered on an alumina base plate at 850° C.

A paste material for an end termination of the resistor is composed of the following composition:

| a metal powder | 100 weight parts |
| --- | --- |

(composed of Cu or Ni metal powder and Pb, Sn or Zn metal powder having a grain diameter of 0.5-1.5 μm with a predetermined mixture ratio shown in Table 1)
a glass frit(average particle size 0.8 μm) 12 weight pars
a binder(made of an acryl resin and an petroleum solvent) a proper quantity An end termination is made by the following steps:

The resistance body is coated at the both ends by dipping it in the paste material and is dried in air at 80° C. Then, it is subjected to a heating treatment in an electric oven with the oxygen content lowered to 2 ppm by means of flowing a nitrogen gas wherein the atmosphere temperature is controlled so that it is raised to 280° C. over 5 hours and then to 550°-600° C. over 30 minutes and thereafter maintained thereto during 15 minutes and lowered to a room temperature.

The resulting element thus manufactured is tested by placing it in the following conditions (A) and (B).

(A) Under an air during 14 hours.

(B) Under an atmosphere containing 60% moisture at 40° C. during 60 hours.

Thereafter, the element is tacked to a glass epoxy base plate provided with a Cu wiring layer by an organic bonding material, then is soldered at 230° C. by a reflow soldering. 50 products thus soldered are subjected to a visual examination, and in some cases there were found some defective ones which are observed to have a clearly non-soldered portion.

As apparent from the below Table 1, an end termination made of Cu or Ni metal containing Pb, Sn or Zn was superior in a solderability, especially after being placed in an oxidizable condition, in comparison with ones not containing the above fluxing metal such as Pb, Sn and Zn.

It is preferred that Cu metal contains 0.3-70 wt % of Pb, 0.8-65 wt % of Sn or 0.5-80 wt % of Zn based on the alloy weight, while Ni metal contains 1.5-45 wt % of Pb, 1.5-55 wt % of Sn or 1.5-65 wt % of Zn based of the alloy weight. If the above fluxing metal content is below the preferred range, no improvement in solderability can be obtained. If the content is above the preferred range, separation of the end termination from the body occurs and thus the defective numbers increases because adhesion power between the end termination and the body decreases before soldering owing to partially melting of the end termination metal, although the solderability is not lowered.

TABLE 1

| No. | Metal Composition | Condition A Defective Number | Condition B Defective Number |
| --- | --- | --- | --- |
| *1 | Cu 100% | 32 | 49 |
| **2 | Cu—Pb 0.1 wt % | 3 | 30 |
| 3 | Cu—Pb 0.3 wt % | 1 | 11 |
| 4 | Cu—Pb 1.5 wt % | 0 | 4 |
| 5 | Cu—Pb 12 wt % | 0 | 1 |
| 6 | Cu—Pb 70 wt % | 0 | 0 |
| **7 | Cu—Pb 90 wt % | 10 | 20 |
| **8 | Cu—Sn 0.1 wt % | 2 | 21 |
| 9 | Cu—Sn 0.8 wt % | 2 | 10 |
| 10 | Cu—Sn 1.5 wt % | 1 | 3 |
| 11 | Cu—Sn 12 wt % | 1 | 1 |
| 12 | Cu—Sn 40 wt % | 0 | 1 |
| 13 | Cu—Sn 65 wt % | 0 | 2 |
| **14 | Cu—Sn 90 wt % | 12 | 28 |
| **15 | Cu—Zn 0.1 wt % | 5 | 28 |
| 16 | Cu—Zn 0.5 wt % | 2 | 7 |
| 17 | Cu—Zn 1.5 wt % | 2 | 2 |
| 18 | Cu—Zn 12 wt % | 0 | 0 |
| 19 | Cu—Zn 40 wt % | 0 | 0 |
| 20 | Cu—Zn 80 wt % | 3 | 5 |
| **21 | Cu—Zn 90 wt % | 29 | 32 |
| *22 | Ni 100% | 8 | 39 |
| **23 | Ni—Pb 0.1 wt % | 3 | 12 |
| 24 | Ni—Pb 1.5 wt % | 1 | 3 |
| 25 | Ni—Pb 5.0 wt % | 0 | 0 |
| 26 | Ni—Pb 12 wt % | 0 | 0 |
| 27 | Ni—Pb 45 wt % | 1 | 3 |
| **28 | Ni—Pb 70 wt % | 11 | 26 |
| **29 | Ni—Sn 0.1 wt % | 4 | 8 |
| 30 | Ni—Sn 1.5 wt % | 2 | 2 |
| 31 | Ni—Sn 5.0 wt % | 0 | 0 |
| 32 | Ni—Sn 7.0 wt % | 0 | 0 |
| 33 | Ni—Sn 12 wt % | 0 | 0 |
| 34 | Ni—Sn 55 wt % | 3 | 4 |
| **35 | Ni—Sn 70 wt % | 10 | 12 |
| **36 | Ni—Zn 0.1 wt % | 5 | 7 |
| 37 | Ni—Zn 1.5 wt % | 2 | 2 |
| 38 | Ni—Zn 5.0 wt % | 1 | 0 |
| 39 | Ni—Zn 7.0 wt % | 0 | 0 |
| 40 | Ni—Zn 12 wt % | 0 | 0 |
| 41 | Ni—Zn 65 wt % | 5 | 4 |
| **42 | Ni—Zn 70 wt % | 12 | 24 |

* and **comparative sample

EXAMPLE 2

Multi-layer ceramic capacitor including Cu internal electrodes

An multi-layer ceramic capacitor is manufactured form the following steps:

The dielectric body is made by forming a Pb composite perovskite dielectric material into a sheet, forming an internal electrode layer thereon, laminating multi-layers, burning out it in air and then metalizing it into only the internal electrodes layer in a hydrogen gas atmosphere below a sintering temperature and finally sintering it.

An end termination is formed and treated in a similar manner as Example 1 and then is subjected to a visual examination in a similar manner as Example 1. The result is shown in the below Table 2.

As apparent from the Table 2, end terminations of Cu or Ni alloy containing at least Pb, Sn or Zn come to have a more improved solderability in comparison with ones made of Cu or Ni metal without Pb, Sn or Zn.

TABLE 2

| No. | Metal Composition | Condition A Defective Number | Condition B Defective Number |
|---|---|---|---|
| *50 | Ni 100% | 12 | 48 |
| *51 | Cu 100% | 29 | 50 |
| 52 | Cu—Pb 5.0 wt % | 1 | 0 |
| 53 | Cu—Sn 5.0 wt % | 0 | 0 |
| 54 | Cu—Sn 5.0 wt % | 0 | 0 |
| 55 | Cu—Sn Pb each 2 wt % | 0 | 0 |
| 56 | Cu—Pb Zn each 2 wt % | 0 | 0 |
| 57 | Ni—Pb 5.0 wt % | 1 | 2 |
| 58 | Ni—Sn 5.0 wt % | 0 | 0 |
| 59 | Ni—Zn 5.0 wt % | 1 | 0 |
| 60 | Ni—Pb Sn each 2 wt % | 0 | 0 |
| 61 | Cu—Zn Sn each 2 wt % | 0 | 0 |

*comparative sample

EXAMPLE 3

Fixed resistor element

A fixed resistor is based on a grazing resistance body made of rhenium oxide-zinc borosilicate glass sintered on an alumina base plate at 950° C.

A paste material for an end termination of the resistor is prepared by mixing the following composition and controlling a solvent amount to have a viscosity of about 8000 cps at 20° C.:

| | |
|---|---|
| a metal powder (composed of Cu powder and Pb metal powder having a grain diameter of 1.5-5.5 μm with a predetermined mixture ratio shown in Table 3) | 100 weight parts |
| a glass frit (average particle size 0.8 μm) | 6 parts |
| an acryl resin with an average molecular of 1800 | 5 parts |
| a solvent mixture of α-terpineol and toluene (6:4) | 30 parts |

An end termination is made by the following steps:

The resistance body is coated at the both ends by dipping it in the paste material and is dried in air at 80° C. Then, it is subjected to a heating treatment in a tubuler type electric oven with an oxygen content lowered to 2 ppm by means of flowing a nitrogen gas wherein the atmospheric temperature is controlled so that it is raised to 280° C. over 5 hours and then to 550°-600° C. over 30 minutes and thereafter maintained thereto during 5 minutes and lowered to a room temperature over 30 minutes.

Figure 1:
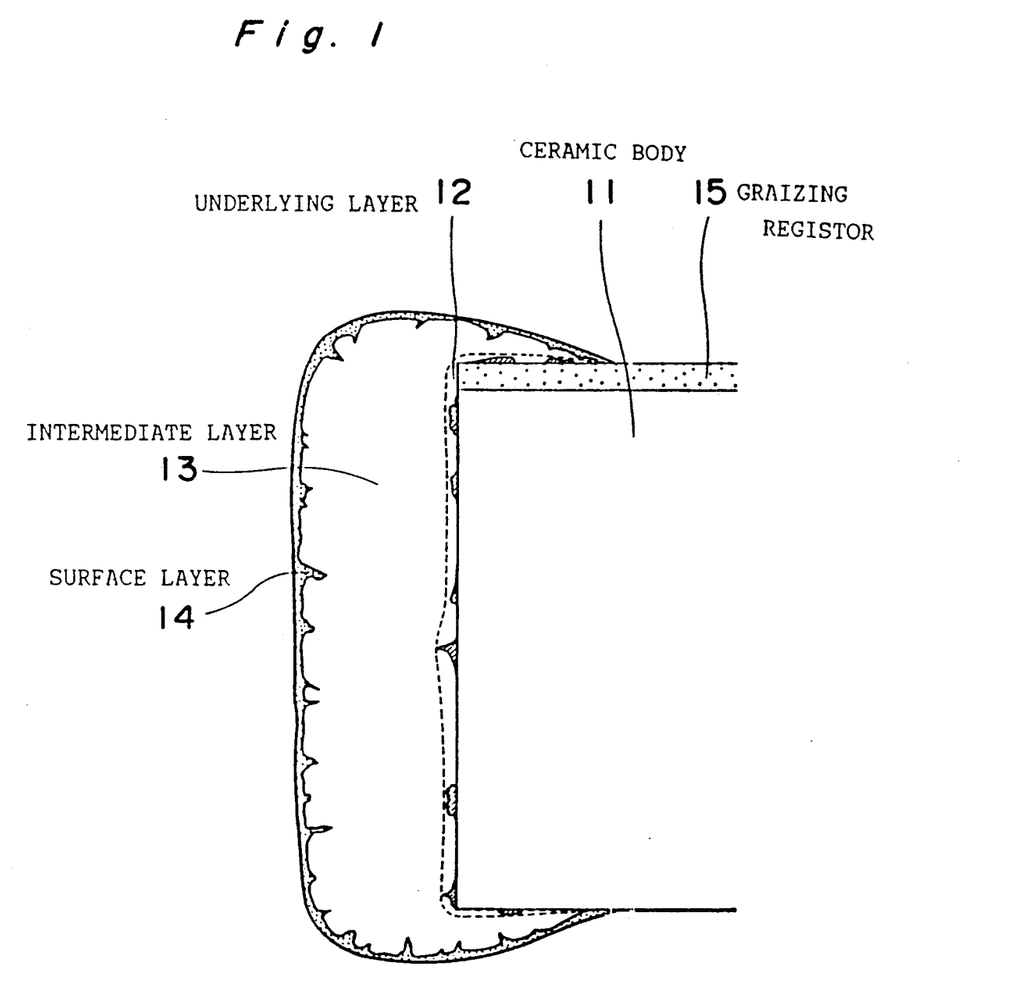
FIG. 1 and FIG. 2 are sectional views of an end termination of a fixed resistor element according to embodiments of this invention.

The resulting element thus manufactured is subjected to a X-ray microanalyzer and a X-ray microdiffraction analyzer to estimate a component distribution. As shown in the accompanying FIG. 1, the end termination comprises an underlying layer 12 containing an inorganic frit which is melt and partially adhered to a ceramic body 11; an intermediate layer 13 having a thickness of about 700 μm and made of a 2-40 μm particle sized mixture phase composed of Cu metal phase and Pb metal phase; and a surface layer having a thickness of 0.3-60 μm and consisting of Pb metal phase. If the Pb content is below 0.1 wt %, there is scarcely observed a Pb metal phase in the intermediate layer.

The resulting element thus manufactured is tested by placing it in the following conditions (A) and (B).

(A) Under an air during 14 hours.

(B) Under an atmosphere containing a 60% moisture at 40° C. during 60 hours.

Thereafter, the element is tacked to a glass epoxy base plate provided with a Cu wiring layer by an organic bonding material, then is soldered at 230° C. by a reflow soldering. 50 products thus soldered are subjected to a visual examination, and in some cases, there were found some defective ones which were observed to have a clearly non-soldered portion (See below Table 3).

In the below Table 3 and 4, there is scarcely observed a Pb metal phase in the intermediate layer (See below comparative sample No.63 in Table 3). In order to compared with a prior method, comparative sample No. 62 is coated with a solder plating layer by subjecting it to a barrel plating treatment in a solder plating liquid (pH:1.0) mainly containing alkanol sulfonic acid. It is judged to be the defective when an resistant value to be measured varies to a more than 50% extent of the initial value. In the below Table 4, there are shown the defective numbers per 100 articles of samples No.62 and No. 66.

In the sample No. 62 with a solder plating except initial defective articles, no soldering defective is found even after the above treatment (A) and (B).

As apparent from the below Tables 3 and 4, the products according to this invention are superior in solderability even after the treatment under an oxidizable condition in comparison with ones made of Cu single metal phase and also have little variation and degradation of the initial properties in comparison with ones provided provided with a solder plating.

The paste material according to this invention preferably contains 0.3-70 wt % of Pb based on the weight of the alloy metal. If the content is below the preferred range, only a little improvement on a solderability can be obtained. If the content is above the preferred range, separation of the end termination from the body occurs and thus the defective numbers increases because adhesion power between the end termination and the body decreases before soldering owing to partially melting of the end termination metal, although the solderability is not lowered.

TABLE 3

| No. | Metal Composition | Condition A Defective Number | Condition B Defective Number |
|---|---|---|---|
| *62 | Cu 100% | 38 | 46 |
| **63 | Cu—Pb 0.1 wt % | 4 | 33 |
| 64 | Cu—Pb 0.3 wt % | 2 | 9 |
| 65 | Cu—Pb 1.5 wt % | 0 | 4 |
| 66 | Cu—Pb 12 wt % | 0 | 2 |
| 67 | Cu—Pb 70 wt % | 0 | 1 |
| **68 | Cu—Pb 90 wt % | 12 | 19 |

* and **comparative sample

TABLE 4

| Sample | Treatment | Initial Defective Number |
| --- | --- | --- |
| No. 62 | Surface Solder Plating | 16 |
| No. 66 | None | 3 |

EXAMPLE 4

Fixed resistor element

A fixed resistor is based on a glazing resistance body made of rhenium oxide-zinc borosilicate glass sintered on an alumina base plate at 1050° C.

A paste material for an end termination of the resistor is prepared by mixing the following composition and controlling a solvent amount to have a viscosity of about 10000 cps at 20° C.:

| | |
| --- | --- |
| a metal powder (composed of Cu metal powder and Sn metal powder having a grain diameter of 1.5-6 $\mu$m and also Cu$_3$Sn powder having an average grain diameter Of 1.5 $\mu$m with a predetermined mixture ratio shown in Table 5) | 100 weight parts |
| a glass frit (average particle size 1.0 $\mu$m) | 4 parts |
| an acryl resin with an average molecular of 1800 | 5 parts |
| a solvent mixture of $\alpha$-terpineol and Carbitol acetate (6:4) | 30 parts |

An end termination is made by the following steps:

The resistance body is coated at the both ends by dipping it in the paste material and is dried in air at 80° C. Then, it is subjected to a heating treatment in a tubular type electric oven with an oxygen content lowered to 2 ppm by means of flowing a nitrogen gas wherein an atmosphere temperature is controlled so that it is raised to 280° C. over 5 hours and then to 550°-600° C. over 30 minutes and thereafter maintained thereto during 5 minutes and lowered to a room temperature over 30 minutes.

Figure 2:
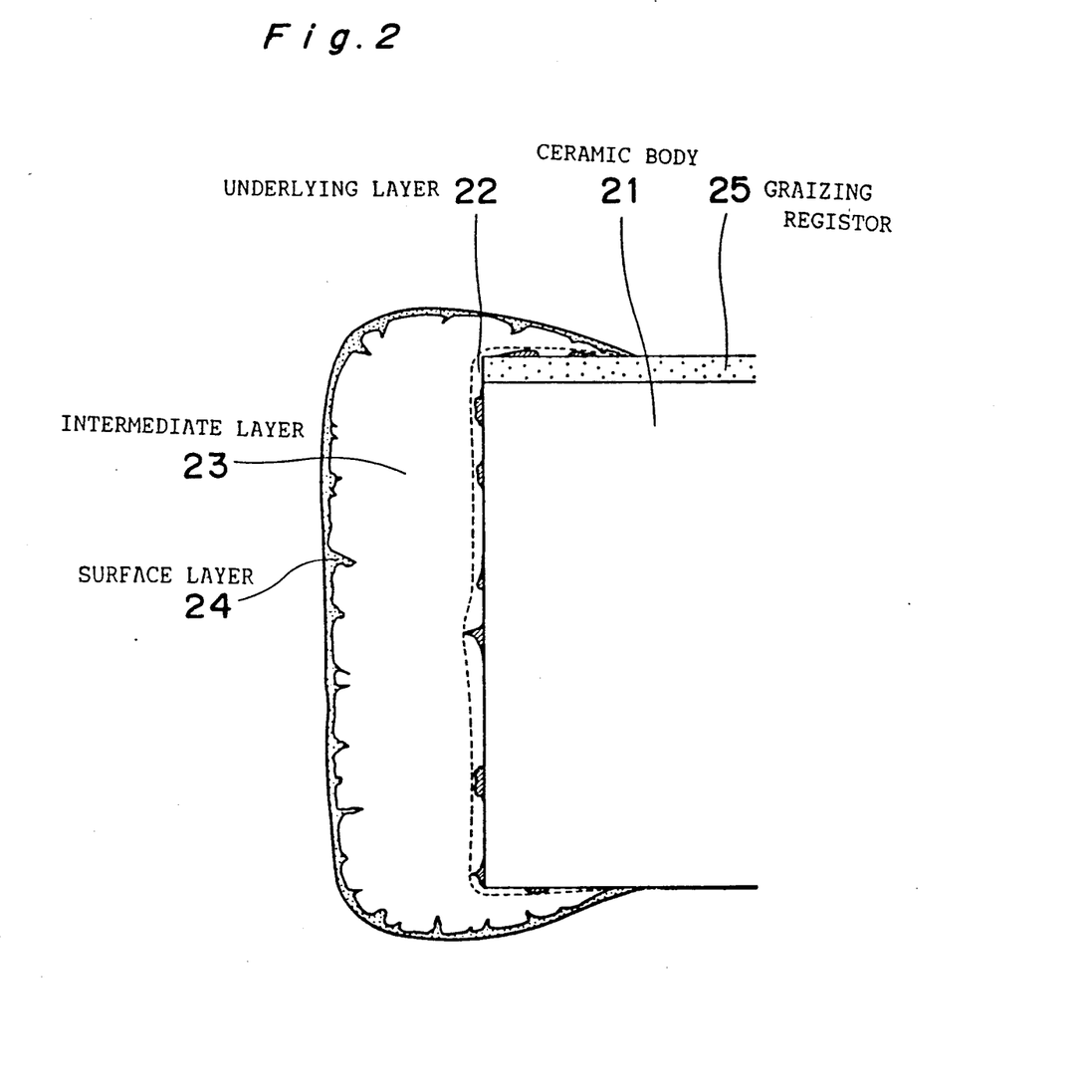

The resulting element thus manufactured is subjected to a X-ray microanalyzer and a X-ray microdiffraction analyzer to estimate a component distribution. As shown in the accompanying FIG. 2, the end termination comprises the most lower portion partially made of an underlayer 22 containing an inorganic frit melt and adhered to a ceramic body 21; an intermediate layer 23 having a thickness of about 700 $\mu$m and made of a about 20 $\mu$m grain sized mixture phase composed of Cu metal phase (in which Sn is partially occluded.), Sn metal phase, Cu$_3$Sn and Cu$_6$Sn$_5$ intermetalic compound phases; and a surface layer 24 having a thickness of 2-60 $\mu$m and consisting of Sn metal phase. If the Sn content is below 0.1 wt %, there is scarcely observed a Sn metal phase in the intermediate layer. If the Sn content is about 0.8 wt %, the intermediate layer is made of a Sn solid solution Cu phase. If Cu$_3$Sn is used as the starting material, no surface Sn metal layer is observed The resulting element thus manufactured is tested by placing it in the following conditions (A) and (B).

(A) Under an air during 14 hours.

(B) Under an atmosphere containing a 60% moisture at 40° C. during 60 hours.

Thereafter, the element is tacked to a glass epoxy base plate provided with a Cu wiring layer by an organic material, then is adhered at 230° C. by a reflow soldering. 50 products thus soldered are subjected to a visual examination, and in some case there were found some defective ones which were observed to have an clearly non-soldered portion (See below Table 5).

In the below Table 5, there is scarcely observed a Sn metal phase in the intermediate layer (See below comparative sample No.70 in Table 5). In sample No.73, no formation of Sn metal phase is observed in the surface layer and no formation of liquid phase is observed by an eutectic reaction or partially melting of metal powder in the sintering temperature. Therefore, No.73 is a comparative example.

As apparent from the below Table 5, the products according to this invention are superior in a solderability, especially after the treatment under an oxidizable condition in comparison with ones made of Cu single metal phase.

The paste material according to this invention preferably contains 0.8-65 wt % of Sn based on the weight of the alloy metal. If the content is below the preferred range, only a small improvement on a solderability can be obtained. If the content is above the preferred range, separation of the end termination from the body occurs and thus the defective numbers increases because adhesion power between the end termination and the body decreases owing to a larger melting amount of the end termination metal. However, even within the preferred range, sample No.73 can form no liquid phase during the sintering process and thus no Sn phase is found on the surface so that no improvement on a solderability after preservation under an oxidizable condition is attained, in comparison with sample No.72 which can form a liquid phase during the sintering process. From the data of Table 5, therefore, it is necessary to form a liquid phase during the sintering process in order to obtain a sufficient improvement effect.

TABLE 5

| No. | Metal Composition | Raw materials (Powder) | Condition A Defective Number | Condition B Defective Number |
| --- | --- | --- | --- | --- |
| *69 | Cu 100% | Cu | 2 | 21 |
| **70 | Cu—Sn 0.1 wt % | Cu Sn | 2 | 18 |
| 71 | Cu—Sn 0.8 wt % | Cu Sn | 1 | 3 |
| 72 | Cu—Sn 12 wt % | Cu Sn | 1 | 1 |
| **73 | Cu—Sn 12 wt % | Cu Cu$_2$Sn | 0 | 8 |
| 74 | Cu—Sn 65 wt % | Cu Sn | 0 | 1 |
| **75 | Cu—Sn 90 wt % | Cu Sn | 12 | 28 |

* and **comparative sample

EXAMPLE 5

Multi-layer ceramic capacitor

A multi-layer ceramic capacitor (size:3.2×1.6×0.7 mm) is made by laminating alternatively ceramic layers of barium titanate 29 having a 20 $\mu$m thickness through Ni internal electrode layers 30 having a 2.1 $\mu$m thickness and also laminating a pair of invalid layers at the top and bottom thereof.

A paste material for an end termination of the resistor is prepared by mixing the following composition and controlling a solvent amount to have a viscosity of about 8000 cps at 20° C.:

| | |
|---|---|
| a metal powder (composed of Ni metal powder and Pb, Sn and Zn metal powders having a grain diameter of 1.5-6 μm with a predetermined mixture ratio shown in Table 6) | 100 weight parts |
| a glass frit of zinc borosilicate (average particle size 0.8 μm) | 4 parts |
| an acryl resin with an average molecular of 1800 | 5 parts |
| a solvent mixture of α-terpineol and Carbitol acetate (6:4) | 30 parts |

An end termination is made by the following steps:

The resistance body is coated at the both ends by dipping it in the paste material and is dried in air at 80° C. Then, it is subjected to a heating treatment in a tubular type electric oven with an oxygen content lowered to 0.5 ppm by means of flowing a nitrogen gas wherein an atmosphere temperature is controlled so that it is raised to 280° C. over 5 hours and then to 550°-600° C. over 30 minutes and thereafter maintained thereto during 5 minutes and is lowered to a room temperature over 30 minutes.

Figure 3:
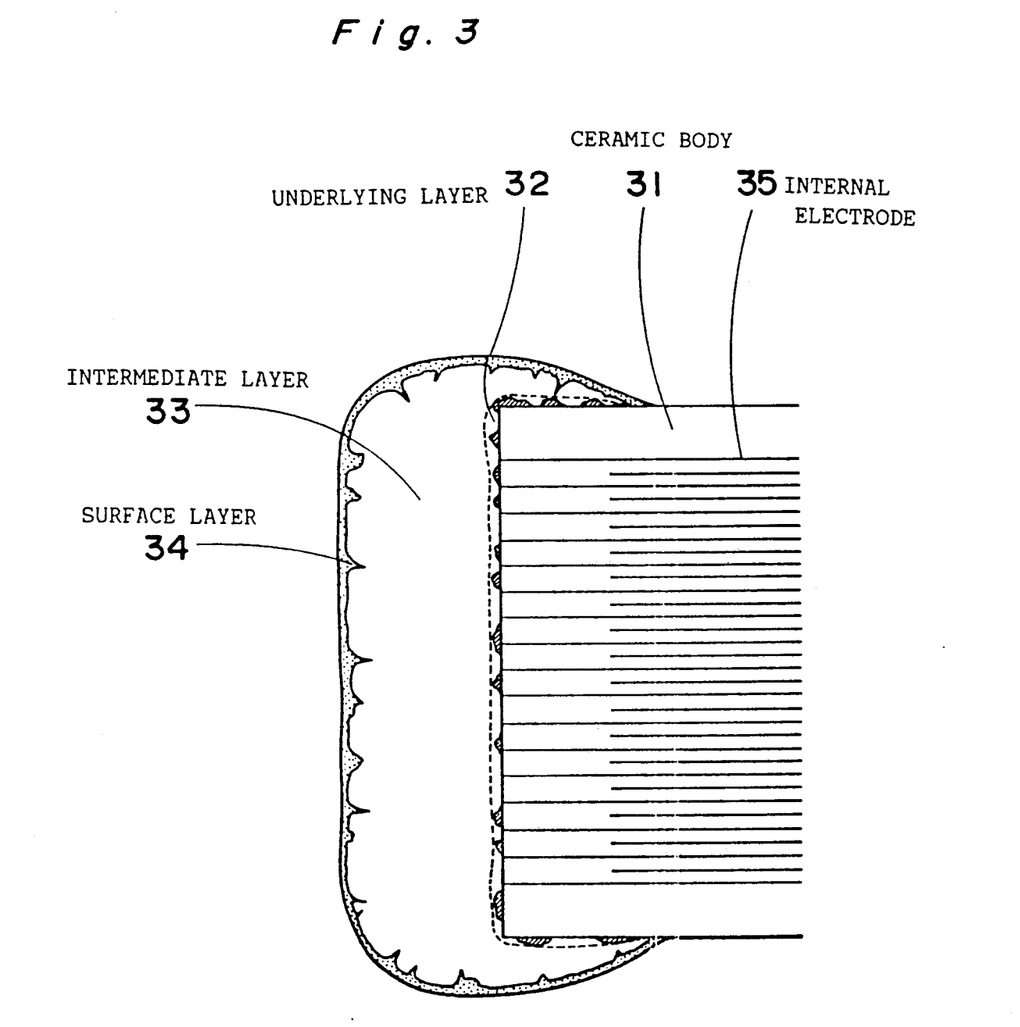
FIG. 3 to 7 are sectional views of various end terminations of a multi-layer dielectric capacitor according to embodiments of this invention.
Figure 4:
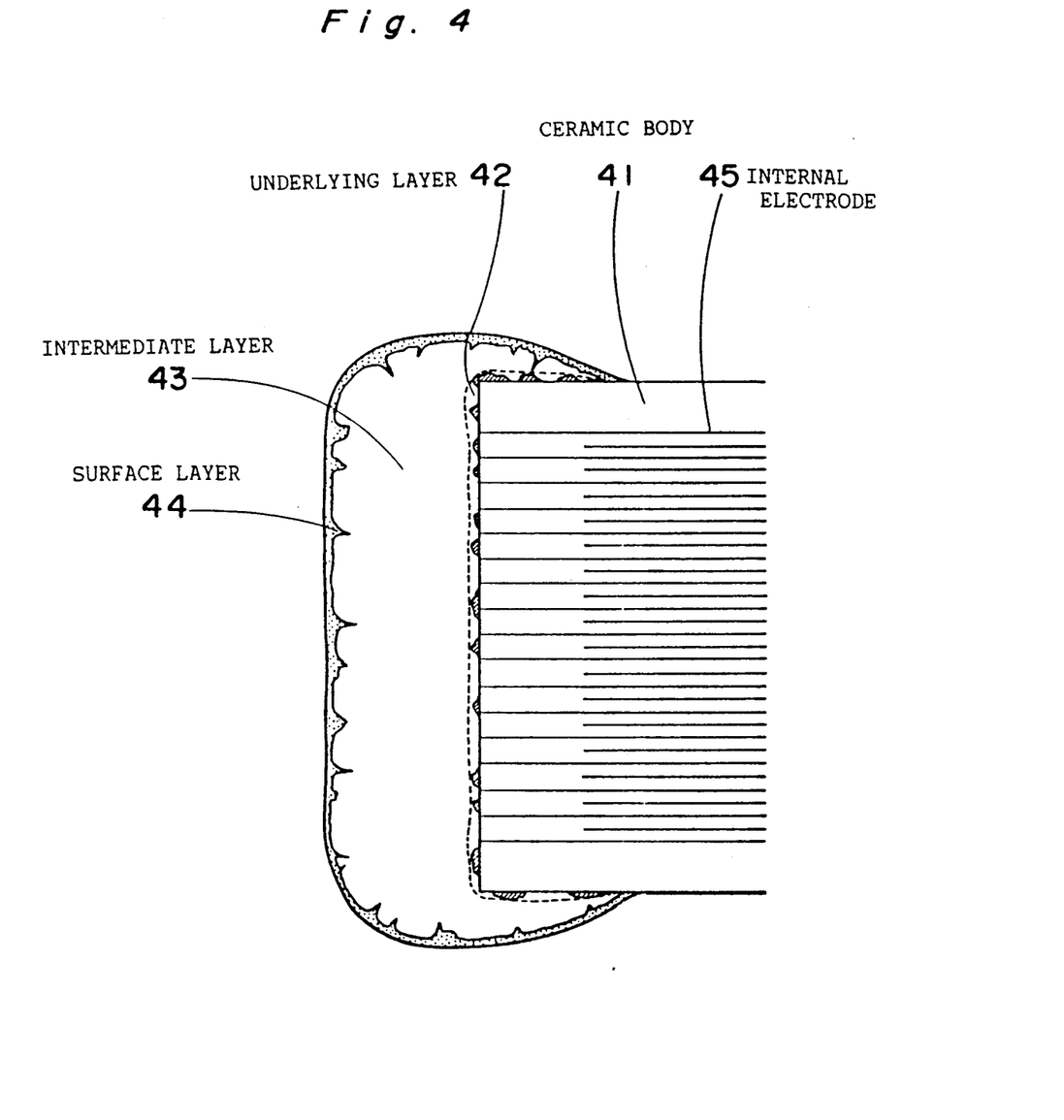
Figure 5:
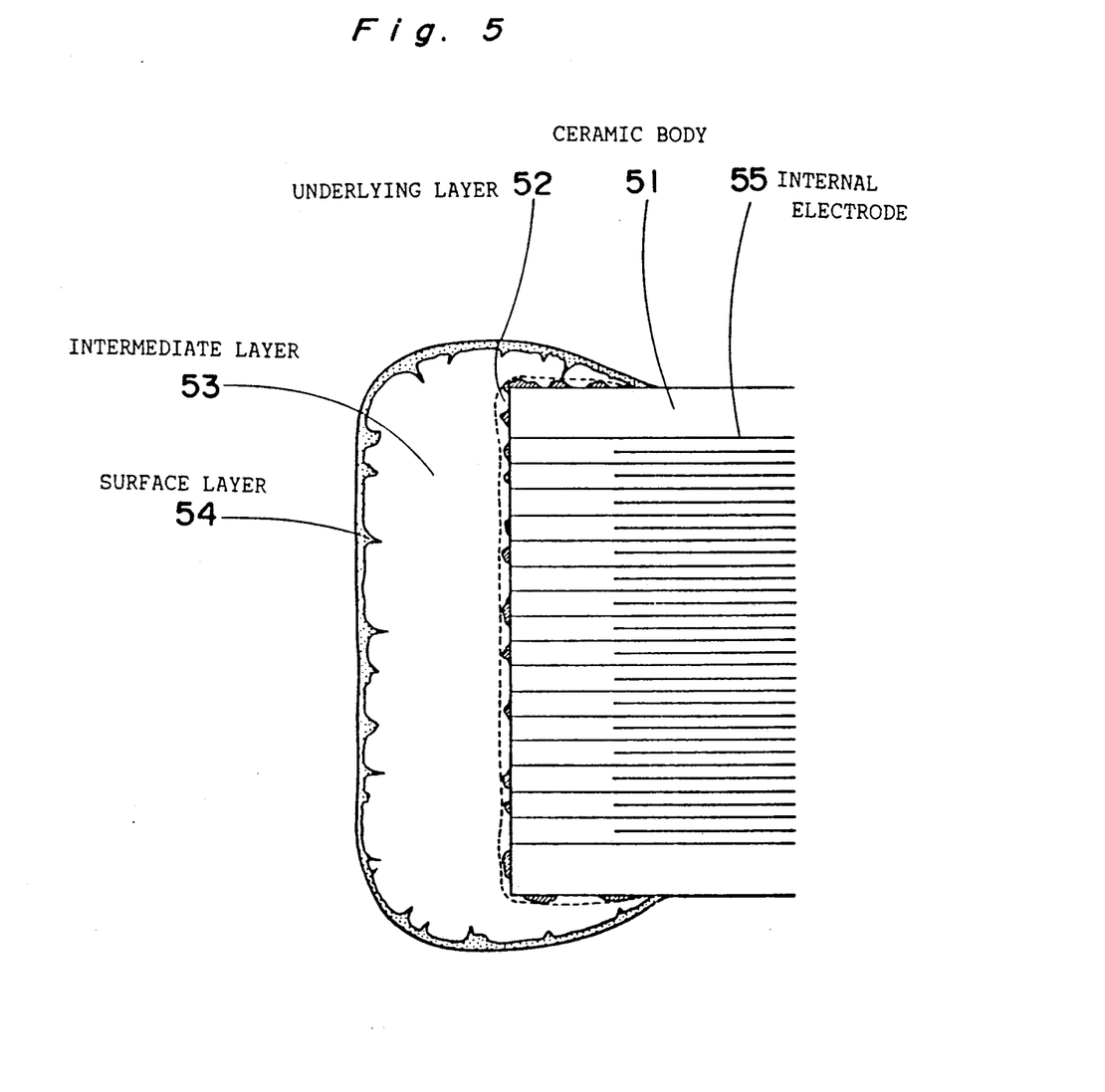

The resulting element thus manufactured is subjected to a X-ray microanalyzer and a X-ray microdiffraction analyzer to estimate a component distribution. The model figures of the end terminations containing Pb, Sn and Zn are shown in the accompanying FIGS. 3, 4 and 5. Each of the end terminations comprises the most lower portion partially made of each underlayer 32, 42 and 52 containing an inorganic frit which is melt and adhered to each ceramic body 31, 41 and 51. In FIG. 3, there exists an intermediate layer 33 made of a about 30 μm grain sized mixture phase composed of Cu metal phase and Pb metal phase. It is confirmed in the Pb content of 1.5 wt % or less that an intermediate layer 33 is a single metal phase wherein a very small amount of Pb is occluded in Ni matrix metal. In FIG. 4, there exists an intermediate layer 43 having an average grain size of 20 μm and made of a mixture phase composed of a metal phase mainly containing Ni (in which less than about 10 wt % of Sn is occluded), Sn metal phase and an intermetallic compound phase. If the Sn content is below 5 wt %, it is confirmed that an intermediate layer is a single metal phase wherein Sn is occluded in Ni matrix metal. In FIG. 5, there exists an intermediate layer 53 having a grain size of 2-30 μm and made of a mixture phase composed of a metal phase mainly containing Ni (in which less than 30 wt % of Zn is occluded), Zn metal phase and an intermetallic compound phase. If the Zn content is below 5 wt %, it is confirmed that an intermediate layer is a single metal phase wherein Sn is occluded in Ni matrix metal. In any cases, intermediate layers have a thickness of about 700 μm. Further, in FIG. 3, the surface layer 34 comprises Pb metal phase. In FIG. 4, the surface layer 44 comprises Sn metal phase. In FIG. 5, the surface layer 54 comprises a single Zn metal phase or a metal mixture phase made of a Zn metal phase and an intermetallic compound phase od Zn and Cu. In any case, the surface layers have a thickness of about 0.5-60 μm. There is found no surface layer in samples containing nothing or less than 0.1 wt % of Pb, Sn and Zn.

The resulting element thus manufactured is tested by placing it in the following conditions (A) and (B).

(A) Under an air during 14 hours.

(B) Under an atmosphere containing a 60% moisture at 40° C. during 60 hours.

Thereafter, the element is tacked to a glass epoxy base plate provided with a Cu wiring layer by an organic bonding material, then is adhered thereto at 230° C. by a reflow soldering. 50 products thus soldered are subjected to a visual examination, and in some case there were found some defective ones which is observed to have an clearly non-soldered portion (See below Table 6).

For comparison with a conventional method, sample No.76 is subjected to a solder plating in a plating liquid (pH 1.0) mainly containing alkanol sulfonic acid by a barrel method.

Samples No.77 and No.88 are dipped in a soldering barrel without preheating and then are subjected to a grinding from an end to a centerline and among 50 samples, a number of the defective having a crack or cracks is counted. The result is indicated in the below Table 7.

As apparent from the below Table 6, an end termination made by carrying out the present invention, is superior in a solderability, especially after the treatment under an oxidizable condition in comparison with one made of Ni single metal phase. The paste material according to this invention preferably contains 1.5 to 45 wt % of Pb, 1.5 to 55 wt % of Sn or 1.5 to 65 wt % of Zn based on the weight of the alloy metal. If the content is below the preferred range, only a little improvement on a solderability can be obtained. If the content is above the preferred range, separation of the end termination from the body occurs and thus the defective number increases because adhesion power between the end termination and the body decreases owing to a larger melting amount of the end termination metal.

As apparent from Table 7, all samples except Nos.95, 96, 102 and 108, comprise an intermediate layer made of a mixture phase composed of Ni metal, Pb, Sn and/or Zn metal and their intermetallic compounds and are hard to be cracked owing to a heat shock, while sample Nos. 95, 96, 102 and 108 comprise an intermediate layer made of Ni single metal phase and, therefore, are easy to be cracked.

For attaining this effect, it is preferred that content of Pb, Sn and Zn be within the above preferred range. This is apparent from the fact that an intermediate layer made of a mixture phase of Ni metal and Pb metal according to this invention, gives an improvement on a heat shock absorption effect.

TABLE 6

| No. | Metal Composition | Condition A Defective Number | Condition B Defective Number |
|---|---|---|---|
| *76 | Ni 100% | 1 | 12 |
| **77 | Ni—Pb 0.1 wt % | 1 | 10 |
| 78 | Ni—Pb 1.5 wt % | 1 | 5 |
| 79 | Ni—Pb 5.0 wt % | 0 | 0 |
| 80 | Ni—Pb 12 wt % | 0 | 0 |
| 81 | Ni—Pb 45 wt % | 0 | 0 |
| **82 | Ni—Pb 70 wt % | 14 | 10 |
| **83 | Ni—Sn 0.1 wt % | 1 | 8 |
| 84 | Ni—Sn 1.5 wt % | 1 | 3 |
| 85 | Ni—Sn 5.0 wt % | 0 | 0 |
| 86 | Ni—Sn 12 wt % | 0 | 1 |
| 87 | Ni—Sn 55 wt % | 0 | 1 |
| **88 | Ni—Sn 70 wt % | 7 | 3 |
| **89 | Ni—Zn 0.1 wt % | 2 | 6 |

TABLE 6-continued

| No. | Metal Composition | Condition A Defective Number | Condition B Defective Number |
|---|---|---|---|
| 90 | Ni—Zn 1.5 wt % | 1 | 5 |
| 91 | Ni—Zn 5.0 wt % | 1 | 1 |
| 92 | Ni—Zn 12 wt % | 1 | 0 |
| 93 | Ni—Zn 65 wt % | 1 | 3 |
| **94 | Ni—Zn 70 wt % | 9 | 12 |
| 148 | Ni-5% Cu-10% Pb | 2 | 0 |

* and **comparative sample

TABLE 7

| No. | Metal Composition | Crack Defective Number |
|---|---|---|
| *95 | Ni 100% Solder Plating | 12 |
| **96 | Ni—Pb 0.1 wt % | 10 |
| 97 | Ni—Pb 1.5 wt % | 2 |
| 98 | Ni—Pb 5.0 wt % | 0 |
| 99 | Ni—Pb 12 wt % | 0 |
| 100 | Ni—Pb 45 wt % | 1 |
| **101 | Ni—Pb 70 wt % | 0 |
| **102 | Ni—Sn 0.1 wt % | 10 |
| 103 | Ni—Sn 1.5 wt % | 4 |
| 104 | Ni—Sn 5.0 wt % | 0 |
| 105 | Ni—Sn 7.0 wt % | 0 |
| 106 | Ni—Pb 55 wt % | 1 |
| **107 | Ni—Pb 70 wt % | 1 |
| **108 | Ni—Zn 0.1 wt % | 11 |
| 109 | Ni—Zn 1.5 wt % | 6 |
| 110 | Ni—Zn 5.0 wt % | 1 |
| 111 | Ni—Zn 7.0 wt % | 2 |
| 112 | Ni—Zn 55 wt % | 0 |
| **113 | Ni—Zn 70 wt % | 3 |
| 149 | Ni-5% Cu-10% Pb | 0 |

* and **comparative sample

EXAMPLE 6

Multi-layer ceramic capacitor

A multi-layer ceramic capacitor (size: 3.2×1.6×0.7 mm) is made by laminating alternatively ceramic layers of Pb composite perovskite 29 having a 20 $\mu$m thickness Ni internal electrode layers 30 having a 1.8 $\mu$m thickness and also laminating a pair of invalid layers having a thickness of 62 $\mu$m at the top and bottom thereof.

A paste material for an end termination of the resistor is prepared by mixing the following composition and controlling a solvent amount to have a viscosity of about 8000 cps at 20° C.:

| | |
|---|---|
| a metal powder (composed of Ni metal powder and Pb, Sn and Zn metal powders and also CuZn$_4$ intermetallic compound powder having a grain diameter of 1.0 to 8.5 $\mu$m with a predetermined mixture ratio shown in Table 8) | 100 weight parts |
| a glass frit of zinc borosilicate (average particle size 0.8 $\mu$m) | 4 parts |
| an acryl resin with an average molecular of 1800 | 5 parts |
| a solvent mixture of α-terpineol and Carbitol acetate (6:4) | 30 parts |

An end termination is made by the following steps:

The resistance body is coated at both ends by dipping it in the paste material and is dried in air at 80° C. Then, it is subjected to a heating treatment in a tubuler type electric oven with an oxygen content lowered to 0.5 ppm by means of flowing a nitrogen gas wherein an atmosphere temperature is controlled so that it is raised to 280° C. over 5 hours and then to 550°-600° C. over 30 minutes and thereafter maintained thereto during 5 minutes and lowered to a room temperature over 30 minutes.

Figure 6:
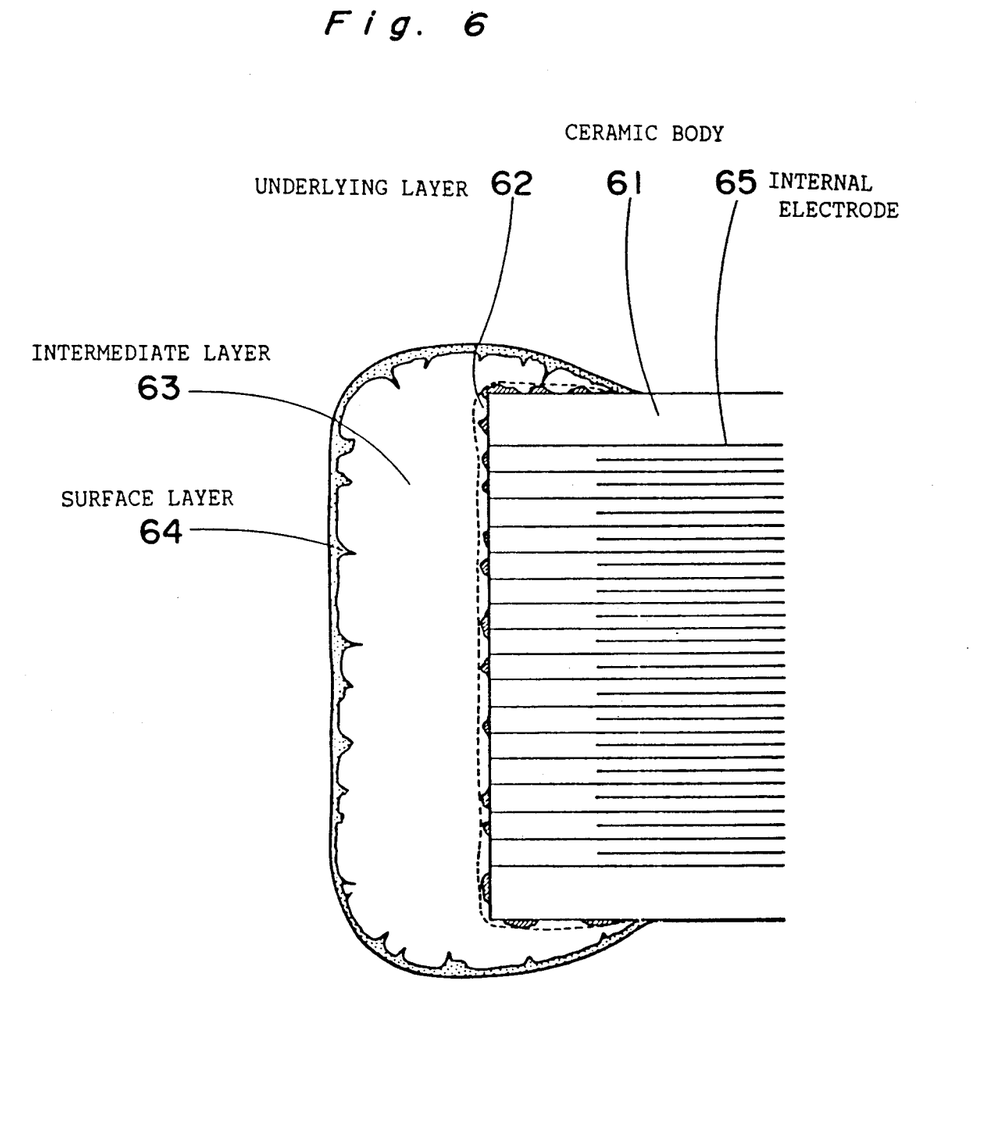
Figure 7:
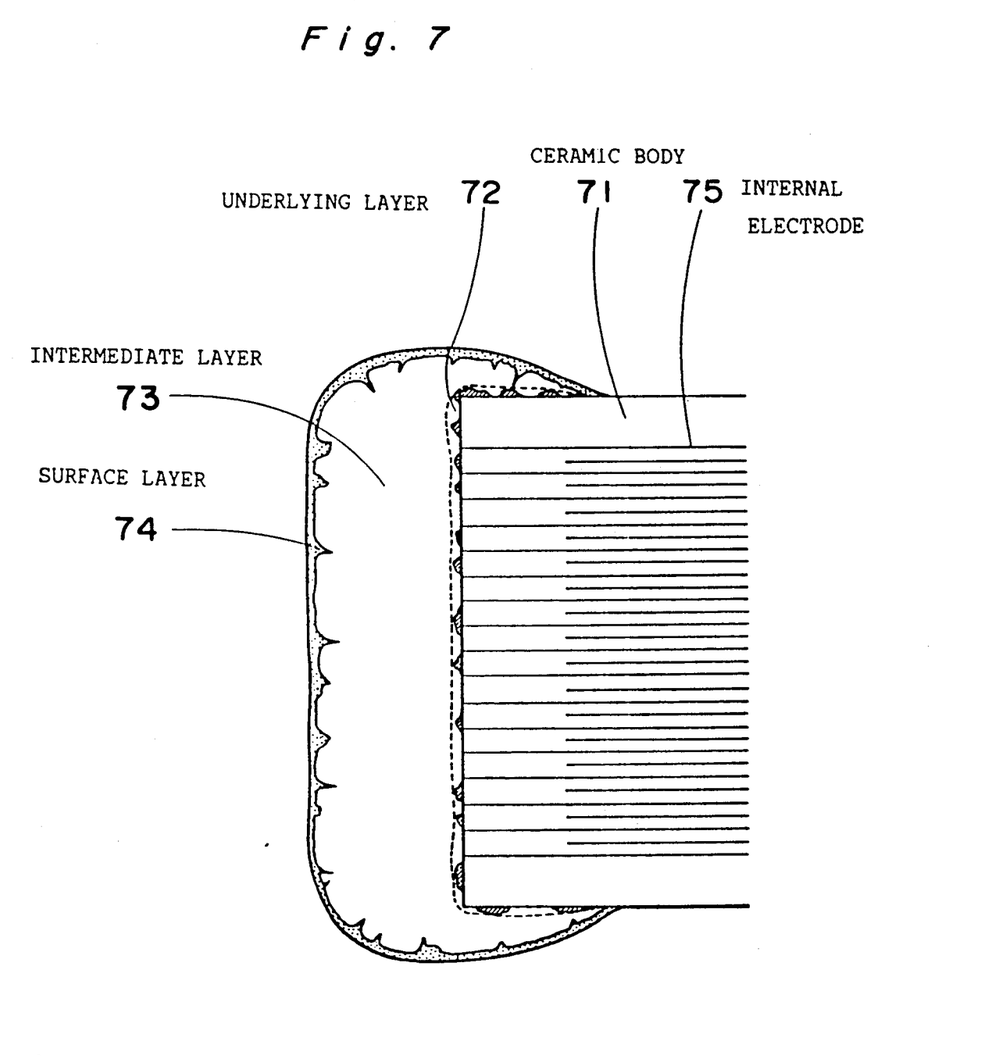

A resulting element thus manufactured is subjected to a X-ray microanalyzer and a X-ray microdiffraction analyzer to estimate a component distribution. The model figures of the end terminations containing Pb and containing Zn and CuZn$_4$ are shown in the accompanying FIGS. 6 and 7. Each of the end terminations comprise the most lower portion partially made of each underlayer 62 or 72 containing an inorganic frit which is melted and adhered to each ceramic body 61 or 71. In FIG. 6, there exists an intermediate layer 63 made of a about 2-30 $\mu$m grain sized mixture phase composed of Cu metal phase and Pb metal phase or made of a solid solution phase. It is confirmed in the Pb content of 1.5 wt % or less that an intermediate layer is a single metal phase wherein a very small amount of Zn is occluded in Cu matrix metal. In FIG. 7, there exists an intermediate layer 73 having an average grain size of 30 $\mu$m and made of a mixture phase composed of a Cu metal phase and Pb metal phase. If the Pb content is below 0.1 wt %, it is confirmed that an intermediate layer is a single metal phase. In any case, intermediate layers have a thickness of about 500 $\mu$m. Further, in FIG. 6, the surface layer 64 comprises Zn metal phase or a mixture phase composed of Zn metal phase and Pb-Zn intermetallic compound phase. In FIG. 7, the surface layer 74 comprises Pb metal phase. In any cases, the surface layers have a thickness of about 0.3-80 $\mu$m. There is found no surface layer in samples containing less than 0.1 wt % of Pb, Sn and Zn.

The resulting element thus manufactured is tested by placing it in the following conditions (A) and (B).

(A) Under an air during 14 hours.

(B) Under an atmosphere containing a 60% moisture at 40° C. during 60 hours.

Thereafter, the element is tacked to a glass epoxy base plate provided with a Cu wiring layer by an organic bonding material, then is adhered thereto at 230° C. by a reflow soldering. 50 products thus soldered are subjected to a visual examination, and in some cases there were found some defective ones which were observed to have a clearly non-soldered portion (See below Table 8).

For comparison with a conventional method, sample No.114 is subjected to a solder plating in a plating liquid (pH 2.5) mainly containing alkanol sulfonic acid by a barrel method.

Sample No.114 and samples No.115 to No.126 elements are dipped in a soldering barrel without preheating and then are subjected to a grinding from an end to a centerline and among 50 samples, a number of the defective having a crack or cracks at side ends of end terminations are counted. The result is indicated in the below Table 9.

As apparent from the below Table 8, an end termination made by carrying out the present invention, is superior in a solderability, especially after the treatment under an oxidizable condition in comparison with one made of Ni single metal phase. The paste material according to this invention preferably contains 0.3 to 70 wt % of Pb, or 1.5 to 80 wt % of Zn based on the weight of the alloy metal. If the content is below the preferred range, only a little improvement on a solderability can be obtained. If the content is above the preferred range, separation of the end termination from the body occurs and thus the defective number increases because adhesion power between the end termination and the body decreases owing to a larger melting amount of the end termination metal.

As apparent from Table 9, all samples Nos.129-133 and Nos.135-139, comprise an intermediate layer made of a mixture phase composed of Cu metal, Zn metal and their intermetallic compounds or a mixture phase of Cu metal and Pb metal and are hard to be cracked owing to heat shock, while sample Nos. 127, 128 and 134 comprise an intermediate layer made of Cu single metal phase and, therefore, are easy to be cracked.

For attaining this effect, it is preferred that the content of Pb and Zn be within the above preferred range. This is apparent from the fact that an intermediate layer made of a mixture phase of Cu metal, Zn metal and their intermetallic compound, or made of a mixture phase of Cu metal and Pb metal according to this invention, gives an improvement on a heat shock absorption effect.

analyzer to estimate a component distribution. The model sectional figures of the end terminations are same as the accompanying FIGS. 6 and 7.

The intermediate layer is made of a mixture phase having a grain size of about 2-60 μm and composed of a metal phase mainly containing Cu metal and an intermetallic compound between Pb, Sn and/or Zn metal and Cu metal to have a total thickness of about 500 μm.

The surface layer is made of a metal phase mainly containing Pb-Sn or Pb-Sn-Bi to have a thickness of 0.3-80μm.

The above elements are subjected to a solderability test and a heat shock test.

The result are indicated in the below tables 10 and 11.

As apparent from the below Table 10, an end termination according to this invention, is improved in solderability, especially after the treatment under an oxidizable condition in comparison with one made of Cu single metal phase.

As apparent from Table 11, samples Nos.145-147 comprise an intermediate layer metal mixture phase composed of a metal phase mainly containing Cu metal, a also their intermetallic compound phase, so that they are hard to be cracked owing to a heat shock, while sample No. 144 comprises an intermediate phase made of Cu single metal phase, so that it is easy to be cracked.

Further, samples Nos.143 and 147 show a possibility that the end termination may contain a third component other than Pb, Sn and Zn and also are expected to exhibit some effects as above.

Since it is obvious that many changes and modifications can be made in the above-described details without departing from the nature and spirit of the invention, it is to be understood that the invention is not limited to said details except as set forth in the appended claims.

TABLE 8

| No. | Metal Composition | Starting Materials | Condition A Defective Number | Condition B Defective Number |
|---|---|---|---|---|
| *114 | Cu 100% | Cu | 32 | 50 |
| **115 | CuZn 0.1 wt % | Cu Zn | 11 | 40 |
| 116 | CuZn 1.5 wt % | Cu Zn | 5 | 12 |
| 117 | CuZn 12 wt % | Cu Zn | 3 | 8 |
| 118 | CuZn 12 wt % | Cu Cu4Sn | 3 | 10 |
| 119 | CuZn 80 wt % | Cu Zn | 9 | 12 |
| **120 | CuZn 90 wt % | Cu Zn | 15 | 30 |
| **121 | CuPb 0.1 wt % | Cu Pb | 11 | 40 |
| 122 | CuPb 0.3 wt % | Cu Pb | 4 | 8 |
| 123 | CuPb 1.5 wt % | Cu Pb | 1 | 0 |
| 124 | CuPb 12 wt % | Cu Pb | 0 | 0 |
| 125 | CuPb 70 wt % | Cu Pb | 4 | 5 |
| **126 | CuPb 90 wt % | Cu Pb | 12 | 12 |

* and **comparative sample

TABLE 9

| No. | Metal Composition | Starting Materials | Crack Defective Number |
|---|---|---|---|
| *127 | Cu 100% Solder Plating | Cu | 32 |
| **128 | Cu—Zn 0.1 wt % | Cu Zn | 29 |
| 129 | CuZn 1.5 wt % | Cu Zn | 8 |
| 130 | CuZn 12 wt % | Cu Zn | 2 |
| 131 | CuZn 12 wt % | Cu Cu4Zn | 1 |
| 132 | CuZn 80 wt % | Cu Zn | 3 |
| **133 | CuZn 90 wt % | Cu Zn | 2 |
| **134 | CuPb 0.1 wt % | Cu Pb | 29 |
| 135 | CuPb 0.3 wt % | Cu Pb | 7 |
| 136 | CuPb 1.5 wt % | Cu Pb | 2 |
| 137 | CuPb 12 wt % | Cu Pb | 0 |
| 138 | CuPb 70 wt % | Cu Pb | 0 |
| **139 | CuPb 90 wt % | Cu Pb | 2 |

* and **comparative sample

EXAMPLE 7

Multi-layer ceramic capacitor

Multi-layer ceramic capacitor comprising a same Cu internal electrode as Example 6 are tected.

An end termination is prepared by mixing a Cu metal powder having a grain diameter of 1.0-3.0 μm and one or more alloy powders having a grain size of about 5 μm selected from 80 wt % Pb-20 wt % Zn, 80 wt % Pb-20 wt % Sn and 75 wt % Pb-20 wt % Sn-5 wt % Bi with a predetermined mixture ratio shown in Tables 10 and 11.

The resulting element thus manufactured is subjected to a X-ray microanalyzer and a X-ray microdiffraction

TABLE 10

| No. | Metal Composition | Condition A Defective Number | Condition B Defective Number |
|---|---|---|---|
| *140 | Cu100% | 32 | 50 |
| 141 | Cu80Pb16Sn4 wt % | 0 | 0 |
| 142 | Cu80Pb16Zn4 wt % | 2 | 3 |
| 143 | Cu80Pb15Sn4Bi1 wt % | 1 | 0 |

*comparative sample

TABLE 11

| No. | Metal Composition | Crack Defective Number |
|---|---|---|
| *144 | Cu 100% Solder | 32 |

TABLE 11-continued

| No. | Metal Composition Plating | Crack Defective Number |
|---|---|---|
| 145 | Cu80Pb16Sn4 wt % | 0 |
| 146 | Cu80Pb16Zn4 wt % | 3 |
| 147 | Cu80Pb15Sn4Bi1 wt % | 0 |

*comparative sample

What is claimed is:

1. An electronic device having a ceramic body and at least one pair of end terminations thereof comprising a surface metal phase for electrical conducting and a bottom inorganic glass phase adhered to the ceramic body, wherein the metal phase is composed of Cu alloy containing one or more of alloying metal components selected from the group consisting of Pb, Sn and Zn.

2. The electronic device according to claim 1, wherein the metal phase is composed of Cu alloy with 0.3 to 70 wt % of Pb based on the weight of the Cu alloy.

3. The electronic device according to claim 1, wherein the metal phase is made of Cu alloy with 0.8 to 65 wt % of Sn based on the weight of the Cu alloy.

4. The electronic device according to claim 1, wherein the metal phase is composed of Cu alloy with 0.5 to 80 wt % of Zn based on the weight of the Cu alloy.

5. An electronic device having a ceramic dielectric body and at least one pair of end terminations thereof comprising a surface metal phase for electrical conducting and a bottom inorganic glass phase adhered to the ceramic body, wherein the metal phase is composed of Ni alloy containing Pb, Sn and.

6. The electronic device according to claim 5, wherein the metal phase is composed of Ni alloy with 1.5 to 45 wt % of Pb based on the weight of the Ni alloy.

7. An electronic device having ceramic dielectric layers laminated with base metal internal electrode layers and at least one pair of end terminations, where the end terminations have a metal phase composed of Cu alloy containing one or more of alloying metal components selected from the group consisting of Pb, Sn and Zn, or wherein the metal phase in the end termination is composed of Ni alloy containing Pb.

8. An end termination for electronic devices or components made by directly sintering an electrode metal material on a ceramic body, which comprises:

(A) a bottom portion at least partially made of an inorganic glass phase adhered to the ceramic body;

(B) a main intermediate portion made of at least one member selected from the group consisting of (B₁) metal mixture phases, which can be made up of at least two phases selected from (1) a matrix metal phase mainly composed of Cu, (2) a fluxing metal phase mainly composed of Pb, Sn and/or Zn and (3) an intermetallic compound phase composed of one of the matrix metals and one or more of the fluxing metals, or (1') a matrix metal phase mainly composed of Ni, (2') a fluxing metal phase mainly composed of Pb and (3') an intermetallic compound phase composed of the matrix metal (1') and the fluxing metal (2') and (B₂) solid solution phases composed of one of the matrix metals and one or more of the fluxing metals;

(C) a surface layer portion at least partially made of a phase which contains higher average content of the fluxing metal than that of the main portion.

9. The end termination according to claim 8, wherein the main portion is one containing a metal mixture phase of the matrix phase mainly composed of Cu metal and the fluxing phase mainly composed of Pb metal, while the surface layer is one mainly or partially composed of Pb metal.

10. The end termination according to claim 8, wherein the main portion is comprised of a solid solution phase composed of Cu including at least Sn metal or a metal mixture phase made up of at least two phases selected from (1) a matrix metal phase mainly composed of Cu, (2) a fluxing metal phase mainly composed of Sn and (3) an intermetallic compound phase composed of Cu and Sn, while the surface layer is a phase mainly or partially made of Sn metal single phase or a mixture phase made of an intermetallic compound phase of Cu and Sn mixed with a Sn metal single phase.

11. The end termination according to claim 8, wherein the main portion is comprised of a solid solution phase composed of Cu including at least Zn metal or a metal mixture phase made up of at least two phases selected from (1) a matrix metal phase mainly composed of Cu, (2) a fluxing metal phase mainly composed of Zn and (3) an intermetallic compound phase made of Cu and Zn, while the surface layer is a phase mainly or partially made of Zn metal single phase or a mixture phase made of an intermetallic compound phase of Cu and Zn mixed with a Zn metal single phase.

12. The end termination according to claim 8, wherein the main portion is comprised of a solid solution phase composed of Ni including Pb or a metal mixture phase of the matrix phase mainly composed of Ni metal and the fluxing phase mainly composed of Pb metal, while the surface layer is one mainly or partially composed of Pb metal.

13. A paste material for forming an end termination of an electronic device and component by a direct sintering treatment on a ceramic body, which comprises (a) a matrix metal powder which can not be melted by itself during the sintering treatment of the paste material, (b) a fluxing metal powder which can be congruently melted or incongruently melted to be a liquid phase by itself or by an eutectic reaction thereof with the matrix metal during the sintering treatment, (c) an inorganic bonding material powder which can be melted and adhered to the ceramic body under the sintering treatment, (d) an organic binding material which makes the other powder mixture into a paste and tends to volatilize out during the sintering treatment of the paste material, wherein the matrix metal is Cu metal powder and the fluxing metal is a metal powder selected from the group consisting of powders of Pb, Sn and/or Zn metal and alloys thereof, or wherein the matrix metal is Ni metal powder and the fluxing metal is a Pb metal powder.

14. The paste material according to claim 13, wherein the matrix metal and the fluxing metal are added as a solid solution metal powder or an alloy metal powder of Cu metal and Pb, Sn and/or Zn metal or between Ni metal and Pb metal.

15. The paste material according to claim 13, which comprises a Cu metal powder, a Pb metal powder, an inorganic frit powder, an organic binder and an organic solvent, wherein Cu to Pb weight ratio is 99.7-30 to 0.3-70.

16. The paste material according to claim 13, which comprises a Cu metal powder, a Sn metal powder, an inorganic frit powder, an organic binder and an organic solvent, wherein Cu to Sn weight ratio is 99.2-35 to 0.8-65.

17. The paste material according to claim 13, which comprises a Cu metal powder, a Zn metal powder, an inorganic frit powder, am organic binder and an organic solvent, wherein Cu to Zn weight ratio is 99.5-20 to 0.5-80.

18. The paste material according to claim 13, which comprises a Ni metal powder, a Pb metal powder, an inorganic frit powder, an organic binder and an organic solvent, wherein Ni to Pb weight ratio is 98.5-55 to 1.5-45.

* * * * *